(12) United States Patent
Hippely et al.

(10) Patent No.: US 11,788,680 B2
(45) Date of Patent: Oct. 17, 2023

(54) DEVICE FOR ATTACHING ITEMS TO SURFACE

(71) Applicants: Keith Hippely, Manhattan Beach, CA (US); Derek Gable, Rancho Palos Verdes, CA (US)

(72) Inventors: Keith Hippely, Manhattan Beach, CA (US); Derek Gable, Rancho Palos Verdes, CA (US)

(*) Notice: Subject to any disclaimer, the term of this patent is extended or adjusted under 35 U.S.C. 154(b) by 0 days.

(21) Appl. No.: 16/860,863

(22) Filed: Apr. 28, 2020

(65) Prior Publication Data

US 2021/0332943 A1 Oct. 28, 2021

(51) Int. Cl.
| | | |
|---|---|---|
| *F16M 13/02* | (2006.01) | |
| *F16B 1/00* | (2006.01) | |
| *G09F 7/18* | (2006.01) | |
| *F16B 47/00* | (2006.01) | |

(52) U.S. Cl.
CPC .............. *F16M 13/022* (2013.01); *F16B 1/00* (2013.01); *F16B 47/00* (2013.01); *G09F 7/18* (2013.01); *F16B 2001/0028* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,076,250 A | * | 10/1913 | Ulrich | G09F 7/18 40/597 |
| 1,932,154 A | * | 10/1933 | Briggs | G09F 1/10 40/597 |
| 3,160,302 A | * | 12/1964 | Chaplin | B65D 79/005 215/271 |
| 3,239,178 A | * | 3/1966 | Pompa | F16B 47/003 248/205.3 |

(Continued)

FOREIGN PATENT DOCUMENTS

DE 29703647 8/1997

OTHER PUBLICATIONS

International Search Report and The Written Opinion of the International Searching Authority in PCT/US21/28365.

*Primary Examiner* — Monica E Millner
(74) *Attorney, Agent, or Firm* — Landmark Intellectual Property Law, LLC; Gregory M Murphy

(57) ABSTRACT

The present invention is directed to a device for attaching items to a surface, including attachment devices for attaching the device to the surface and pressure components connected to the attachment device, the pressure component having an upturned lip. The device may comprise a rib on a bottom surface to receive the attachment device such as adhesive, putty, fasteners, magnets, suction cups, etc. Pressure components may be biased toward the surface or a plate. Pressure may be applied between the pressure components and the surface or plate due to a curved lip on the pressure component. The pressure component and plate may (Continued)

be biased toward each other. The device may comprise an attachment core configured to receive the attachment device and attach to the pressure components. The device may include promotional designs or markings, and/or may be configured to hold items in a substantially non-coplanar arrangement with the surface.

21 Claims, 14 Drawing Sheets

(56) References Cited

U.S. PATENT DOCUMENTS

| | | | | |
|---|---|---|---|---|
| 3,736,899 A * | 6/1973 | Manske | | B65D 79/005 116/270 |
| 3,827,020 A * | 7/1974 | Okamoto | | H01F 7/02 335/285 |
| 4,058,335 A * | 11/1977 | Abe | | E05C 19/16 292/251.5 |
| 4,875,654 A * | 10/1989 | Chandonnet | | A47G 1/17 248/467 |
| 4,899,974 A * | 2/1990 | Wear | | A47G 1/21 248/467 |
| 5,133,524 A * | 7/1992 | Liu | | F16B 47/00 248/205.8 |
| 5,369,899 A * | 12/1994 | Reeves | | A44C 3/001 24/303 |
| 5,714,215 A * | 2/1998 | Sheffield | | G09F 7/12 248/309.3 |
| 5,746,329 A * | 5/1998 | Rondeau | | E04H 15/64 211/123 |
| 6,244,550 B1 * | 6/2001 | Blatchford | | A62B 9/04 248/222.52 |
| 6,305,656 B1 | 10/2001 | Lasecki | | |
| 6,405,983 B1 * | 6/2002 | Goj | | F16B 19/1081 248/205.1 |
| 6,453,518 B1 * | 9/2002 | Adams | | B42F 15/066 24/67.9 |
| 6,477,749 B1 * | 11/2002 | Reiter | | A41F 1/002 24/303 |
| 6,676,097 B2 * | 1/2004 | Chu | | D04D 7/10 248/205.3 |
| 6,749,165 B2 * | 6/2004 | Immerman | | A47G 1/17 248/205.5 |
| 6,811,127 B1 * | 11/2004 | Shiao | | B25H 3/04 211/70.6 |
| 7,097,144 B2 * | 8/2006 | Kohno | | A47G 25/0607 223/85 |
| 7,641,167 B2 * | 1/2010 | Sheffield, Jr. | | G09F 21/02 248/683 |
| 7,740,221 B2 * | 6/2010 | Sheffield, Jr. | | G09F 21/02 248/683 |
| 7,963,010 B2 * | 6/2011 | Levesque | | A44B 99/00 24/561 |
| 8,308,118 B2 * | 11/2012 | Sheffield | | F16B 47/00 248/309.3 |
| 8,604,375 B2 * | 12/2013 | Yltchev | | H01H 13/48 200/406 |
| 8,894,026 B2 * | 11/2014 | Lin | | F16M 13/00 248/205.5 |
| 9,488,214 B2 * | 11/2016 | Orban | | F16B 47/00 |
| 10,410,555 B2 * | 9/2019 | Nigro | | G09F 21/02 |
| 10,895,279 B2 * | 1/2021 | Thomas | | F16B 47/00 |
| 2002/0114926 A1 | 8/2002 | Malpass | | |
| 2004/0045137 A1 * | 3/2004 | Hsiao | | B42F 1/02 24/67.9 |
| 2007/0209265 A1 * | 9/2007 | Robb | | G09F 3/204 40/658 |
| 2010/0088863 A1 * | 4/2010 | Moy | | A47K 10/14 24/459 |
| 2010/0107378 A1 | 5/2010 | Johnson | | |
| 2010/0175975 A1 * | 7/2010 | Yltchev | | H01H 13/06 200/406 |
| 2011/0253304 A1 | 10/2011 | Wemyss | | |
| 2014/0069828 A1 | 3/2014 | Lasecki | | |
| 2014/0284438 A1 | 9/2014 | Dominguez | | |
| 2015/0136922 A1 * | 5/2015 | Shamsadov | | F16B 47/00 248/206.2 |

* cited by examiner

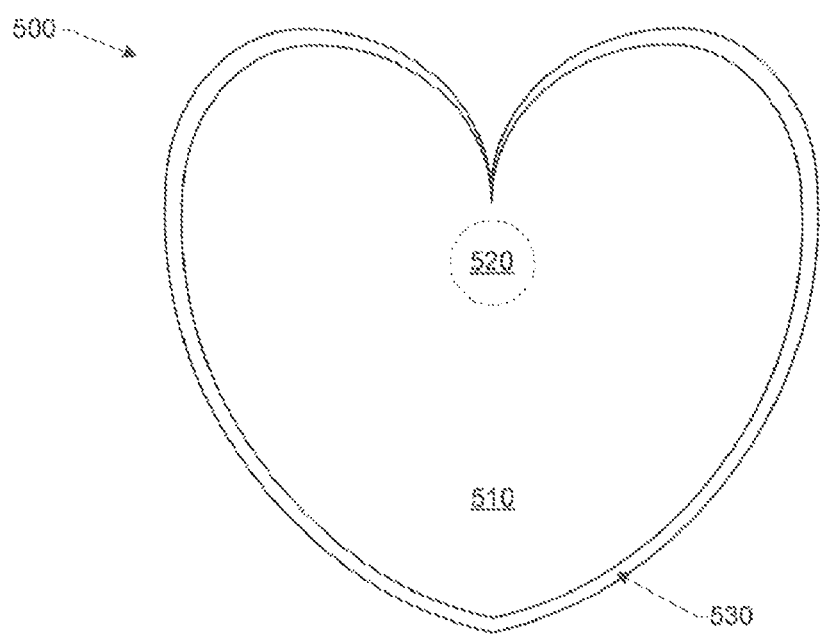
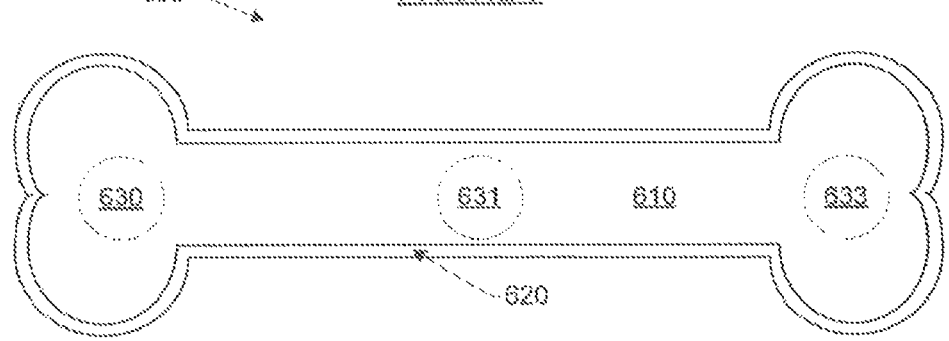

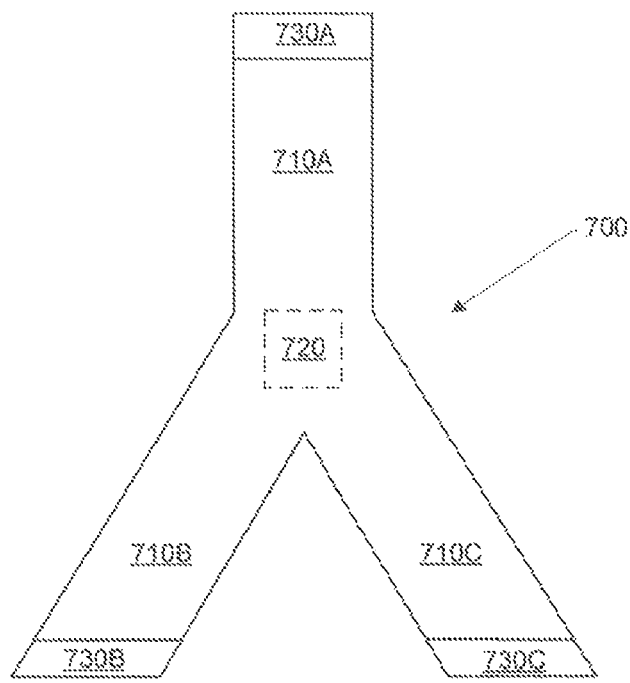
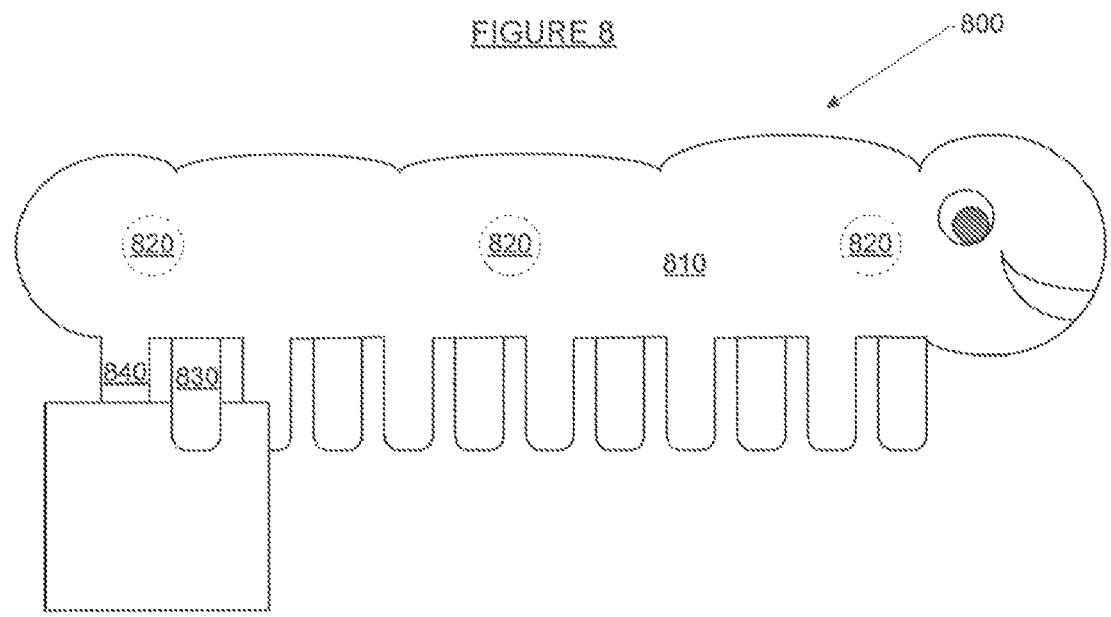

DEVICE FOR ATTACHING ITEMS TO SURFACE

BACKGROUND

It is known in the art to attach various items, such as papers, cards, photographs, etc., to a surface using methods and/or devices such as tape, nails, hooks, pushpins, thumbtacks, or adhesives. However, such devices and methods may have numerous drawbacks. Many of these devices may destroy, ruin, or irreversibly alter a paper, card, or photograph. For example, devices such as nails, pushpins, and/or thumbtacks may require puncturing a hole in the paper, card, or photograph. Tape and adhesives often may not be removable from such papers, cards, or photographs without causing damage. Accordingly, a device that may display or attach such papers, cards, or photographs without causing any damage or alteration thereto is desirable.

In addition, devices such as tape, nails, hooks, pushpins, and/or thumbtacks generally only hold such items flat against a surface—often in a substantially co-planar arrangement. Accordingly, a device that may hold one or more items such as paper, cards, or photographs in various positions other than substantially co-planar is desired.

Moreover, known attachment devices such as the aforementioned tape, nails, hooks, or adhesives generally do not provide or present any stylized designs or shapes. It is desirable for an attachment device to be of an aesthetically pleasing configuration. It is also desirable to have an attachment device that may be configured to display a logo or name, for example in a promotional capacity.

In addition, each of the aforementioned devices require a more involved operation. For example, retaining an item using a pushpin or tape may require a two-handed operation, to hold the item and to install the retaining device. Accordingly, a device that may enable one-handed operation may be desired.

SUMMARY OF THE INVENTION

In accordance with some embodiments of the present invention, aspects may include a device for attaching items to a surface, the device comprising: one or more attachment devices for attaching the device to the surface; one or more pressure components connected to the attachment device, the pressure component configured with at least one upturned lip.

In accordance with some embodiments of the present invention, aspects may include attachment devices such as an adhesive, adhesive tape, foam adhesive tape, putty, adhesive putty, screws, nails, tacks, thumbtacks, pushpins, bolts, rivets, magnets, hooks, hook-and-loop devices, and suction cups.

In accordance with some embodiments of the present invention, aspects may include pressure components that are biased toward a surface, and/or pressure components that are biased towards a plate.

In accordance with some embodiments of the present invention, aspects may include a device for attaching items to a surface, the device comprising: one or more attachment devices configured for attachment to the surface; one or more pressure components configured with at least one upturned lip; one or more attachment cores configured to receive the attachment device and attach or fasten to the one or more pressure components.

In accordance with some embodiments of the present invention, the device may be configured to hold items in a substantially non-coplanar arrangement with the surface.

These and other aspects will become apparent from the following description of the invention taken in conjunction with the following drawings, although variations and modifications may be affected without departing from the spirit and scope of the novel concepts of the invention.

DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 5 depicts a top view of an exemplary device for attaching items to a surface, in accordance with some embodiments of the present invention.

FIG. 6 depicts a top view of an exemplary device for attaching items to a surface, in accordance with some embodiments of the present invention.

FIG. 7 illustrates a top view of an exemplary device for attaching items to a surface, in accordance with some embodiments of the present invention.

FIG. 8 illustrates a top view of an exemplary device for attaching items to a surface, in accordance with some embodiments of the present invention.

Figure 1:
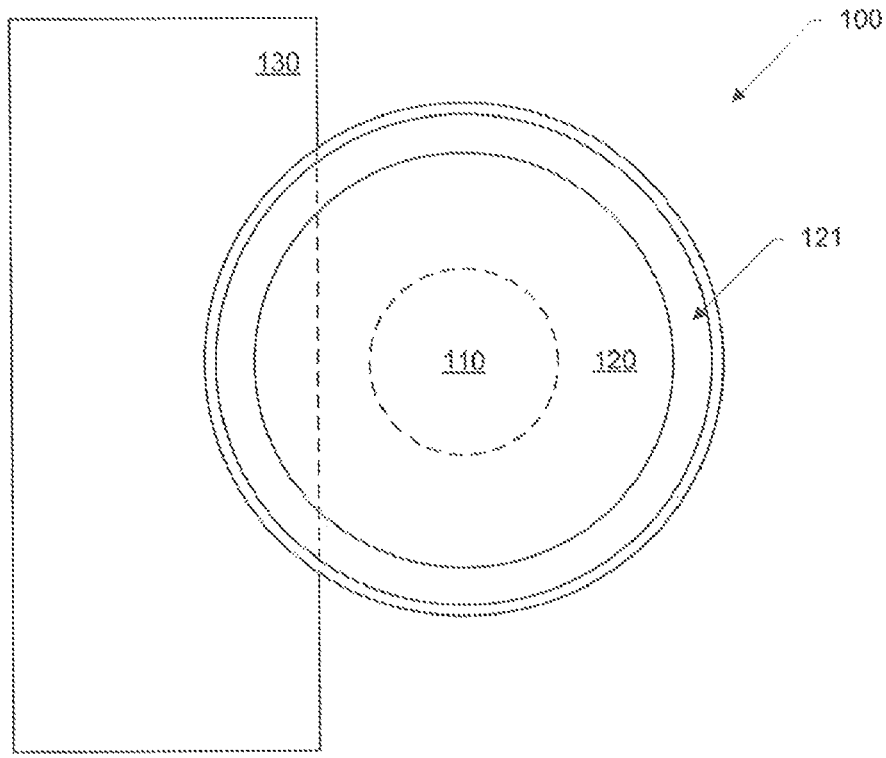
FIG. 1 illustrates a top view of an exemplary device for attaching items to a surface, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

In general, some embodiments of the present invention may utilize one or more pressure components attached to a surface using one or more attachment elements. Pressure component(s) may hold an item, for example, a photograph or card, onto or against a surface by pressure exerted by one or more pressure components, which may create friction forces between pressure component and the surface. Such friction force may hold the item with sufficient force to hold them in place on the surface so as to withstand minor jostling or, in the case that surface is vertical, to withstand the force of gravity.

In accordance with some embodiments of the present invention, pressure components may comprise a slightly lowered lip or edge around its perimeter, and a slightly upturned lip or edge which may enable easy placement of the item between the pressure component and the surface. As discussed in greater detail below, the pressure component may be of any shape, and may utilize a gap between the attachment element and the lowered lip to allow a portion of the item to slip between the lip and attachment element sufficient to allow friction force to hold the item in position against small outside forces such as gravity.

As noted above, and in accordance with some embodiments of the present invention, the item may be held between a pressure component and a surface. It is also contemplated that the present invention may include an additional component such that the item may be held between a pressure component and a secondary component, thereby potentially avoiding holding the item directly against the surface, for example in situations where the surface may be rough or uneven. As discussed in greater detail below, this may permit the items to be held in orientations other than substantially co-planar with the surface.

One or more attachment elements may be used to attach the device to a surface. This may be accomplished using any sort of adhesive or adhesive device as known in the art, including but not limited to an adhesive, adhesive tape, putty, soft rubbery adhesive, adhesive foam piece, or an adhesive tape. Moreover, it is understood that an attachment element may utilize any other means or method of attachment, such as a hook and loop fastener, a mechanical fastener such as a pushpin, nail, screw, bolt, tack, rivet, suction cup, hook, magnet, electromagnet, etc. It is further contemplated that the attachment element may be configured specifically for a particular surface, for example magnetic in the case of a metallic surface (or metallic in the case of a magnetic surface), a hook in the case of a surface with one or more holes (either pre-manufactured, such as a pegboard, or created for use of the device), or even an opening or aperture into which a protrusion of a surface may be inserted. Similarly, attachment devices such as an adhesive putty may be advantageous over other attachment methods (such as an adhesive tape) where the surface may have a texture that is not smooth, such as a rough piece of wood or a textured paint, as the putty may conform to the texture resulting in a sufficient attachment.

Note that the pressure element may have a flexible quality itself, where the material flexes to permit the insertion of an item. Alternatively, the pressure element may have little flex, but may permit insertion through the use of an additional flexible element such as a spring. Each of these variations are discussed in more detail below.

Note that in accordance with some embodiments, the device may comprise an attachment device that engages with an attachment portion, which may then be inserted and/or otherwise attached to the pressure component and device. For example—and as discussed in greater detail below—an attachment element such as adhesive or putty may be attached or otherwise connected to an attachment portion, which may then be attached or connected to the remainder of the device. For example, the attachment portion may be inserted into an aperture in the device via an interference fit or may be screwed into the device using a threaded connection between the attachment portion and the device.

As discussed in greater detail below, this may also enable a device to utilize different attachment elements and/or methodologies but permitting different attachment portions—which may be configured for different attachment elements—to be connected with the same device. In this manner, a universal device may be provided, with variations in attachment elements and methodologies supported by variations in the attachment portion, rather than modifying the entire device.

A pressure component may comprise any suitable material, such as but not limited to a semi-rigid material such as plastic, but may comprise any material with sufficient flex to permit a lip or edge of the device to move enough to allow the desired item to slide between it and surface or substrate. The material of the pressure component may be clear, translucent, opaque, and/or any combination thereof. For example, the pressure component may further comprise decorative printing or designs on its surface. Such printings or designs may be of any type, size, or color, and may be decorative and/or provide commercial identity or other indicative purpose. Such printings or designs may be of any manner, including but not limited to printed in ink or paint, attached via label, embossed, molded or hot stamped, and/or incorporated with any other method. In accordance with some embodiments of the present invention, such printings or designs may convey information to a user, such as promotional advertising information.

With respect to the item(s) being held by the device, it is to be understood that the device may be configured to hold many types of items, such as but not limited to photographs, papers, cards crafts, tools, office supplies (e.g., writing instruments, paperclips, envelopes, labels, etc.) compact discs, etc.

In use, the device may permit the insertion and removal of an item using, for example, a one-handed motion to slide the item under upturned edge and between lip and surface. This method is in contrast to attachment methods currently used that require two hands, such as using tape or pushpins to attach the item to a surface. To remove the item, it is simply pulled and slid out with sufficient force to overcome the friction holding the item in place.

Note that the device is not limited by specific items, but rather by the ability of the device to retain specific items (either between the pressure component and the surface or between the pressure component and an additional element, such as a backing plate). This may be controlled by the amount of friction and/or pinching force exerted by the device, and/or by the distance between the pressure component and the surface or additional element. The further the pressure element flexes or moves, the greater the force may be pushing against an inserted item, but insertion of the item may be more difficult. Forces may also be modified based on material selection, spring coefficients/sizes selected, etc.

For example, to retain a thin item such as a paper or photograph, the pressure component may be in direct or near direct contact with the surface or additional element, and a small degree of force may be required for retention. However, to retain a larger item such as a pencil, the pressure component may be spaced a certain distance away from the surface or additional element to fit the item, and/or a larger degree of force. In other words, the ability of the device to hold items is impacted by item size and/or thickness combined with the friction force necessary to retain the item. In accordance with some embodiments of the present invention, the device may need to be tuned for larger or specific items to identify a proper balance of required flex.

Other mechanism are also contemplated, such as a device that may be installed on a substantially vertical surface where the device may hinged at an upper location and may pivot about the hinge, causing a force pinching the item between the device and the surface.

It is further contemplated that the present invention may be installed by hand, or with the assistance of an additional feature or device. For example, a handle may be used to enable easy placing and removal of the device from a surface. A handle may assist, for example, in the attachment device being properly and/or fully engaged with the surface or substrate. The handle may be independent or may be a feature of the device configured for easy or convenient grasping during installation and/or removal.

Figure 2:
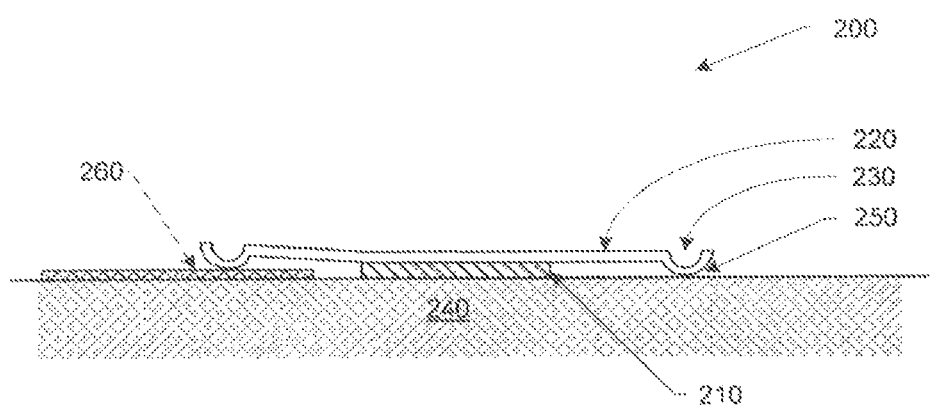
FIG. 2 illustrates a cross-section of an exemplary device for attaching items to a surface, in accordance with some embodiments of the present invention.

With reference to FIG. 1, a device 100 for holding items in accordance with some embodiments of the present invention will now be discussed. FIG. 1 illustrates a top view of a device 100 which may comprise attachment device 110 and pressure component 120, which may include a portion or lip 121 that may be in contact with a surface (as shown in FIG. 2 and discussed below). Item 130—for example a paper or photograph—may be held by device 100, as described herein.

FIG. 2 illustrates a cross-section of a device 200 in accordance with some embodiments of the present invention. In general, FIG. 2 illustrates a device 200 comprising an attachment device 210, a pressure component 220, and a portion or lip 230 that may be in contact with, or nearly touching, a surface 240. In operation, an item (such as but not limited to a photograph, card, paper, etc.) may be inserted between the portion or lip 230 of the pressure component 220 and the surface 240 at 250, such that the item may be retained between the surface and the pressure component 220. Item 260 may be slid under lip 230 to retain the item.

Figure 3:
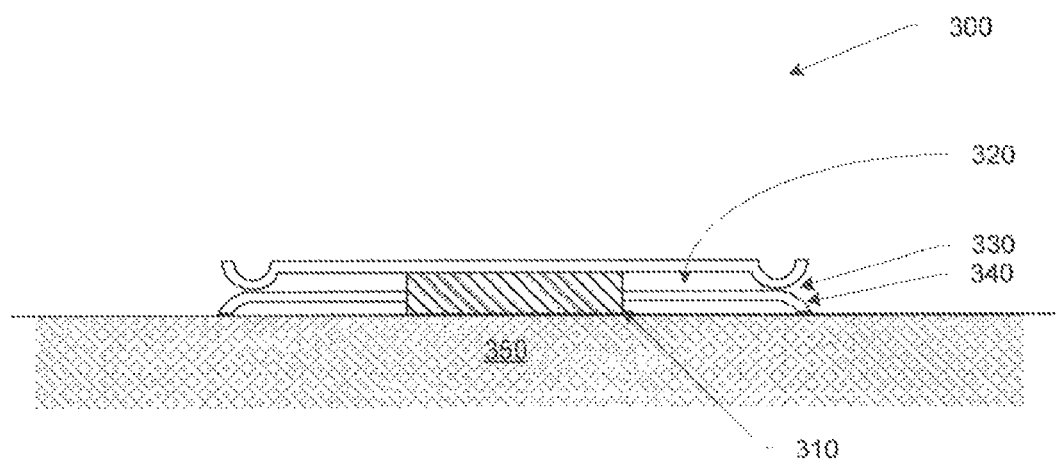
FIG. 3 illustrates a cross-section of an exemplary device for attaching items to a surface, in accordance with some embodiments of the present invention.

It is contemplated that a device may not depend upon an underlying surface upon which it is mounted to hold an item but may pinch and hold an item using portions of the device itself. With reference to FIG. 3, a device 300 in accordance with some embodiments of the present invention is shown. In general, device 300 may comprise an attachment device 310, a pressure component 320 with a portion or lip 330 that may be in contact with, or nearly touching, element 340. Note there may be a degree of tuning involved in selecting and configuring the element in order to provide a sufficient friction force (and/or "pinching" force) to retain the item, but not so much force as to render it difficult or inconvenient to insert the item into or under the device.

Device 300, unlike devices 100 and 200 shown above, may utilize an element 340 upon which portion or lip 330 may be in contact with or nearly touching, such that an item held by the device may be held between the pressure component 320 and element 340, and may not be in direct contact with surface 350. In other words, rather than pinching an item between a pressure component and a surface, it is also contemplated that an item may be pinched between a pressure component and an additional element.

Note that the remainder of this document may discuss, illustrate, or present embodiments utilizing either a single pressure component pressing toward or against a surface or a pressure component pressing against or toward an additional element. While only one of these variations may be shown in various figures or discussed, it is to be understood that either variation may be present in any of the devices discussed and shown herein.

Figure 4:
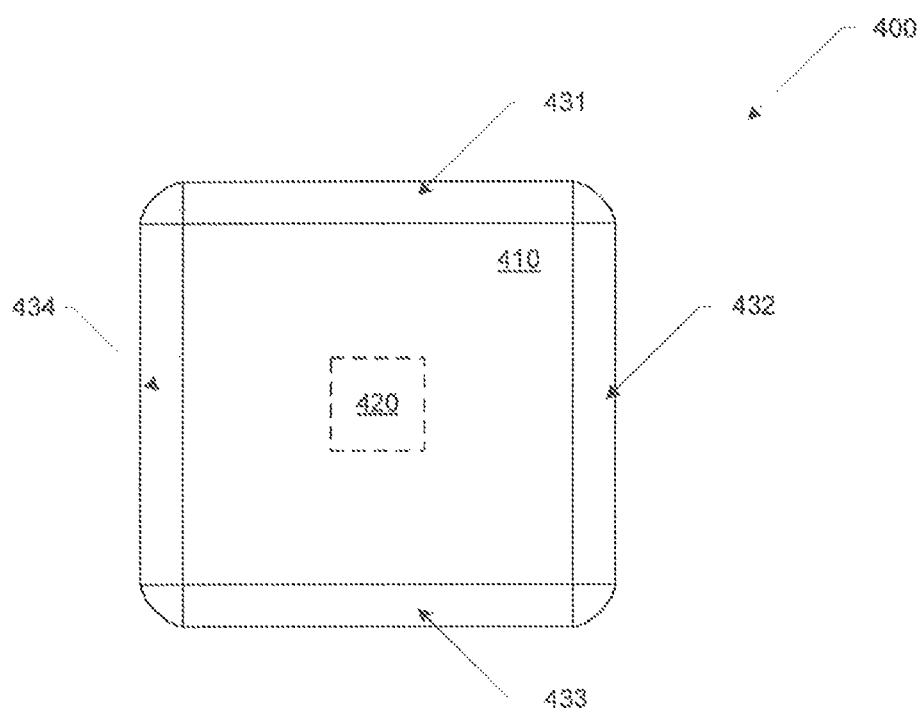
FIG. 4 depicts a top view of an exemplary device for attaching items to a surface, in accordance with some embodiments of the present invention.

It is contemplated that a single device may comprise multiple pressure element components that provide abilities to hold an item. With reference to FIG. 4, a variation on the overall design of a device in accordance with some embodiments of the present invention is shown. Device 400 may comprise a pressure component 410 that may be attached to a surface using attachment device 420. Device 400 may have more than one portion or lip 431, 432, 433, 434 that may be in contact with—or nearly touching—a surface upon which the device may be mounted.

Similarly, it is contemplated that a device may comprise an attachment device that is positioned asymmetrically or merely not centered in the device. For example, FIG. 5 illustrates a heart-shaped device 500 in accordance with some embodiments of the invention. Device 500 may comprise a pressure component 510 an attachment device 520 and lip 530. Attachment device 520 that may be positioned in a top portion of the heart, rather than centered. This may permit items to be slid further under the bottom portion of the heart under the lip 530.

It is also contemplated that a device may comprise multiple attachment devices. With reference to FIG. 6 a device 600 may comprise a pressure component 610 with a lip 620 around the perimeter of the component, and may further comprise multiple attachment devices 630, 631, 632. Multiple attachment devices may be utilized if the device is larger, or if a stronger connection is needed overall or to maintain sufficient and/or adequate pressure to retain items.

Much as a device may comprise multiple attachment devices, it is also contemplated that in accordance with some embodiments of the present invention a device may comprise multiple pressure components. With reference to FIG. 7 a device 700 is illustrated that may comprise various portions 710A, 710B, 710C of a pressure component, with each portion having a lip 730A, 730B, 730C which may provide contact with a surface to hold an item. Note that as discussed above, this device may also include a secondary element and an item may be pinched between the lip and a secondary element.

With reference to FIG. 8, a device 800 in accordance with some embodiments of the present invention comprising alternating pressure elements and secondary elements will now be discussed. Device 800 may comprise a general surface 810 that may be mounted to a surface using one or more attachment devices 820. General surface 810 may comprise one or more portions (shown as "legs") 830 that may apply pressure in one direction, with one or more secondary elements 840 applying pressure in an opposite direction. In this manner, an item 850 may be inserted between portions 830 and secondary elements 840. It is also contemplated that a device such as 800 may comprise multiple portions or "legs" that are substantially coplanar, and an item may be retained merely be inserting the item between alternating legs.

Figure 9:
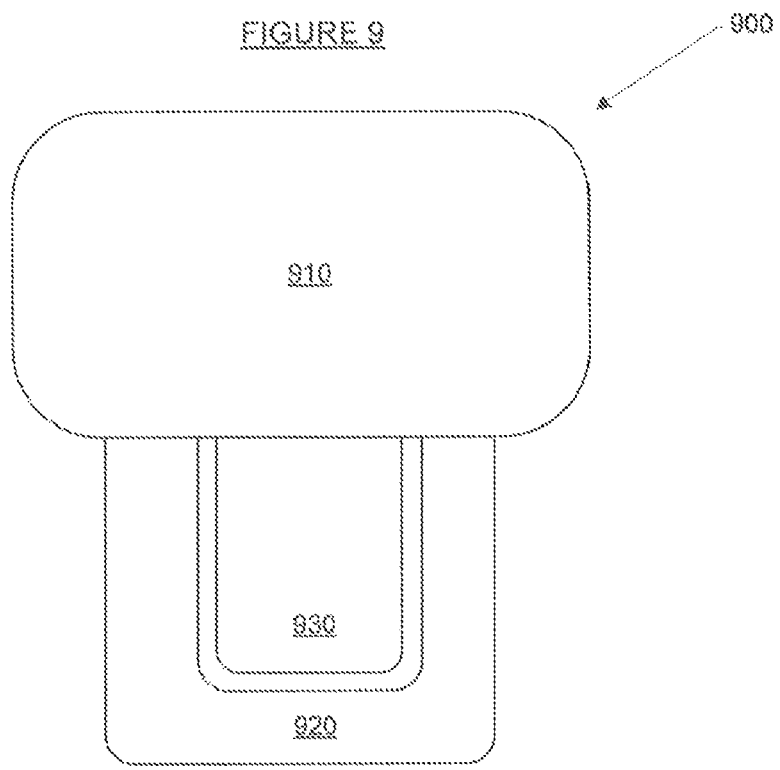
FIG. 9 depicts a top view of an exemplary device for attaching items to a surface, in accordance with some embodiments of the present invention.

FIG. 9 illustrates a device 900 in accordance with some embodiments of the present invention that may utilize two elements biased in opposite directions. Device 900 may comprise a first surface 910, from which at least two elements —920 and 930—may extend. Element 920 may be biased toward element 930, and element 930 may be biased toward element 920. In this manner, an item inserted between elements 920 and 930 may be retained by a friction force exerted by the elements caused by the pinching.

Figure 10:
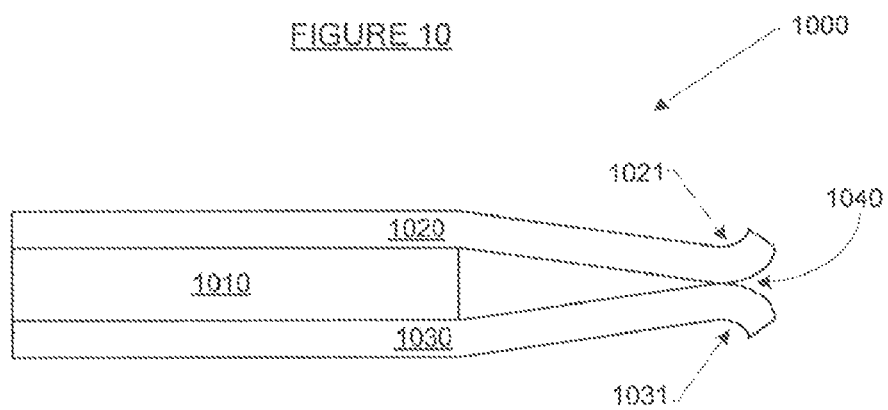
FIG. 10 illustrates a cross-section of an exemplary device for attaching items to a surface, in accordance with some embodiments of the present invention.

FIG. 10 illustrates a cross-section of such a device 1000 utilizing two elements 1020, 1030, biased towards each other. It can be seen that device 1000 may comprise a body 1010 from which elements 1020 and 1030 may extend. It is shown that elements 1020 and 1030 may extend from opposite sides of body 1010; however, this is not required for operation of the device and is simply one illustrated variant. Element 1020 may comprise a portion or lip 1021 that may be biased towards element 1030, while element 1030 may comprise a portion or lip 1031 that may be biased towards element 1020. Note that portions or lips 1021, 1031 may contact each other in some embodiments, and may not contact each other in other embodiments. In other words, an item inserted between lips 1021, 1031 may be directly pinched between the two elements at 1040 or may be retained due to the opposing forces applied by lips 1021, 1031 to the item.

Figure 11A:
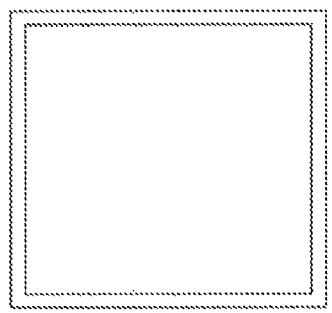
FIG. 11A-11H illustrate various designs and configurations of an exemplary device for attaching items to a surface, in accordance with some embodiments of the present invention.
Figure 11B:
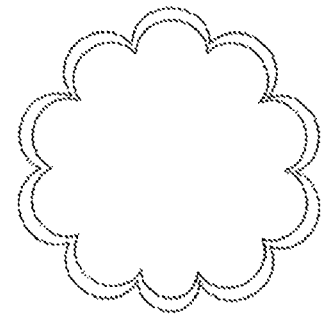
Figure 11C:
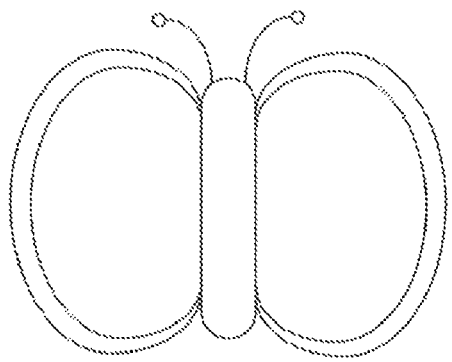
Figure 11D:
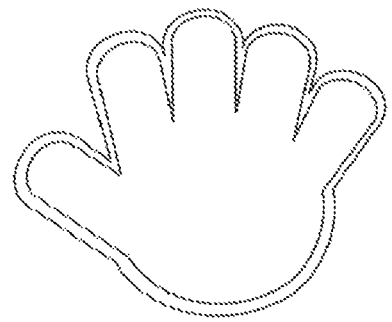
Figure 11E:
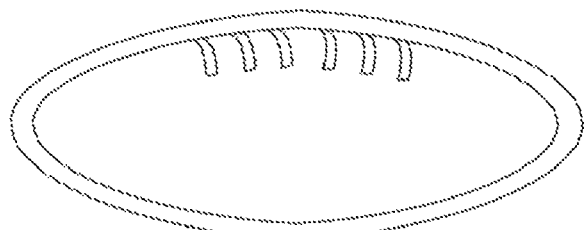
Figure 11F:
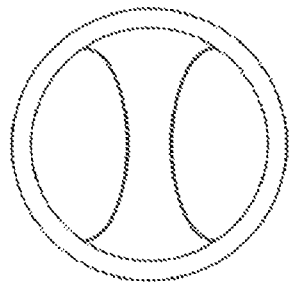
Figure 11G:
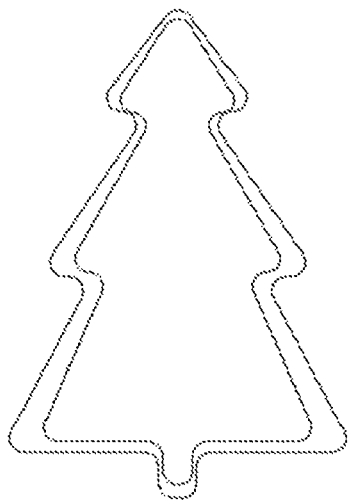
Figure 11H:
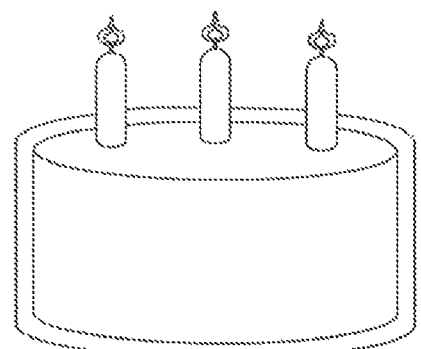

It is important to note that the present invention may take nearly any shape or configuration without departing from the scope or spirit of the invention. With reference to FIG. 11, various exemplary shapes and configurations are illustrated. For example, FIG. 11A illustrates a substantially quadrilateral shape, while FIG. 11B illustrates a starburst or flower shape. FIG. 11C shows a butterfly shape (with two separate pressure components as wings), while FIG. 11D illustrates a hand or glove-like shape. FIGS. 11E and 11F illustrate sporting shapes, a football and baseball respectively. FIGS. 11G and 11H indicate more celebratory shapes, such as a Christmas tree at FIG. 11G and a birthday cake at FIG. 11H.

Figure 12A:
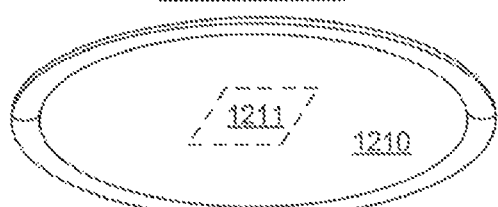
FIGS. 12A and 12B illustrates an exemplary device for attaching items to a surface, in accordance with some embodiments of the present invention.
Figure 12B:
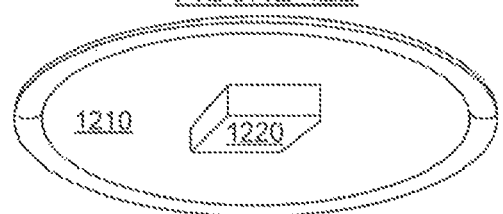

As noted above, a device in accordance with some embodiments of the present invention may be attached using various attachment devices. FIGS. 12A and 12B illustrate a device 1210 that may use an adhesive 1220 (such as a foam adhesive tape) to attach the device 1210 to a surface. Device 1210 may have an identified area 1211 for locating an adhesive.

Adhesive tape 1220 may be of any suitable type, such as double-sided tape, (double sided meaning having adhesive on both sides of a flexible tape), double-sided foam tape, adhesive-infused flexible material, or the like. It may be of any thickness and size sufficient to hold the pressure element in such distance from the surface of the substrate such that lip is of the appropriate distance so as to exert a sufficient force on an item to hold it in place. An embodiment as shown in FIGS. 12A and 12B may be cost effectively manufactured (for example, by vacuum forming), potentially reducing a cost of such a device.

Figure 13A:
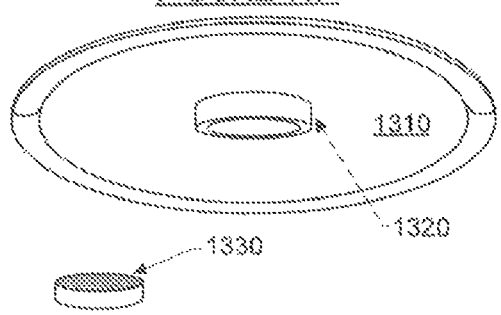
FIGS. 13A and 13B illustrates an exemplary device for attaching items to a surface, in accordance with some embodiments of the present invention.
Figure 13B:
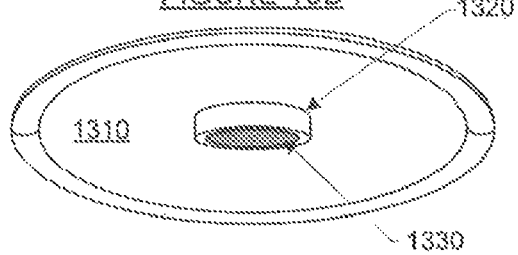

FIGS. 13A and 13B illustrate the use of a magnet for an attachment device. FIGS. 13A and 13B illustrate a device 1310 which may comprise a rib 1320 that may assist in the connection with an attachment device. For example, a magnet 1330 may be inserted into the rib 1320. The magnet 1330 may be glued within the rib 1320 or may be held in place by being pressed into the rib 1320 thereby causing an interference fit. FIG. 13B illustrates the device 1310 with the magnet 1330 being positioned or located within the rib 1320.

Note that in FIGS. 13A and 13B the rib 1320 is shown as a circular rib. However, it is contemplated that any shaped rib or support may be used (square, rectangular, any other polygonal shape, etc.). Moreover, some embodiments of the present invention may not utilize a full rib or support, but instead may have partially enclosed area, indention, depression, raised border, etc. It is also contemplated that the rib may be omitted, and the attachment device may merely be connected to the device.

Figure 14A:
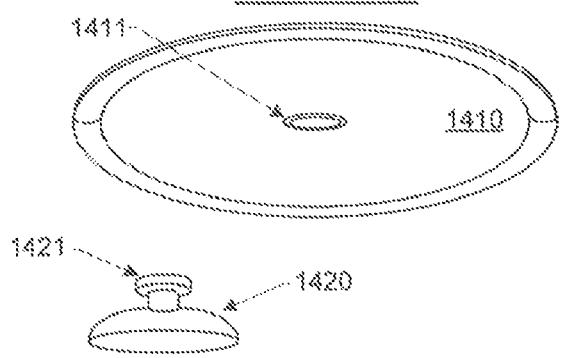
FIGS. 14A and 14B illustrates an exemplary device for attaching items to a surface, in accordance with some embodiments of the present invention.
Figure 14B:
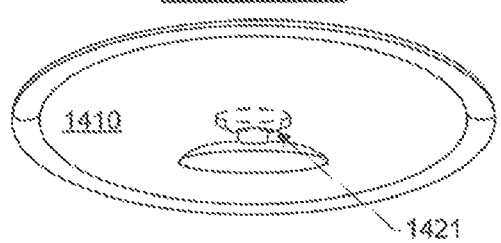

FIGS. 14A and 14B illustrate the use of a suction cup as an attachment device. Device 1410 may comprise an aperture 1411 through which a suction cup 1420 may be inserted. Suction cup 1420 may be retained in the aperture 1411 using a flange 1421 on the suction cup. Such flange 1421 may be pushed or otherwise snapped through the aperture such that the flange prevents the suction cup 1420 from being easily removed from the device 1410. FIG. 14B illustrates a device 14010 with an installed suction cup, showing the flange 1421 on one side of the device 1410, with the suction cup itself 1420 on the other side of the device 1410.

Figure 15A:
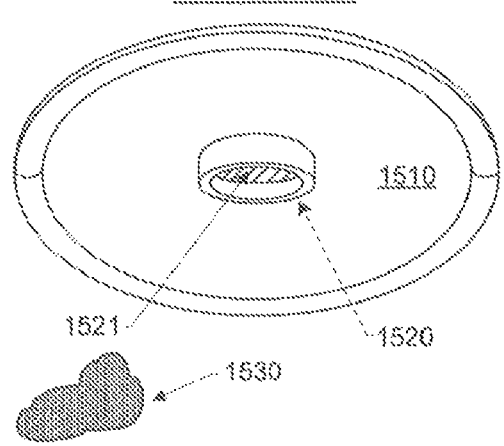
FIGS. 15A and 15 B illustrates an exemplary device for attaching items to a surface, in accordance with some embodiments of the present invention.
Figure 15B:
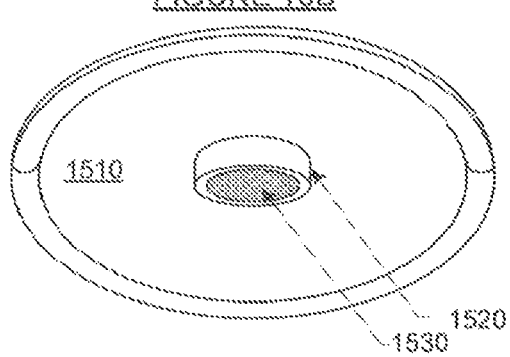

With reference to FIGS. 15A and 15B, the use of putty as an attachment device will now be discussed. Similar to that discussed above, device 1510 may comprise a circular rib 1520 for positioning and locating of putty 1530. However, in order to ensure that putty has a sufficient attachment to the device, it is contemplated that at least a portion surface of the device inside the circular rib may be textured to provide additional surface area for which the putty to attach. In accordance with some embodiments, this texturing may take the form of internal ribs or protrusions formed within the circular rib. FIG. 15B illustrates the putty 1530 inserted within the circular rib 1520.

Note that while the circular rib is shown integral to the device, it is contemplated that various portions of the device may be manufactured separately and assembled before use. In other words, it is contemplated that a single device may be manufactured with a smooth surface (which may, for example, be suitable for installation using an adhesive tape), while a circular rib portion (with or without internal striations or ribs) may be attached, glued, screwed on, or otherwise connected to the overall device.

Figure 16A:
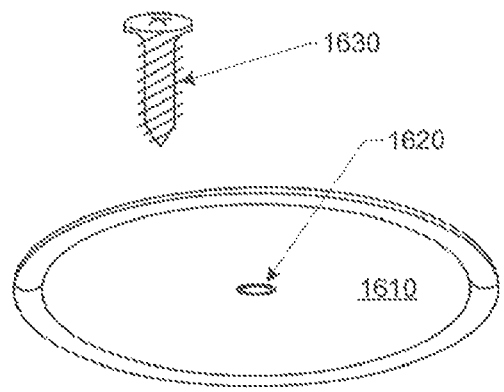
FIG. 16A depicts an exploded view of an exemplary device for attaching items to a surface, in accordance with some embodiments of the present invention.
Figure 16B:
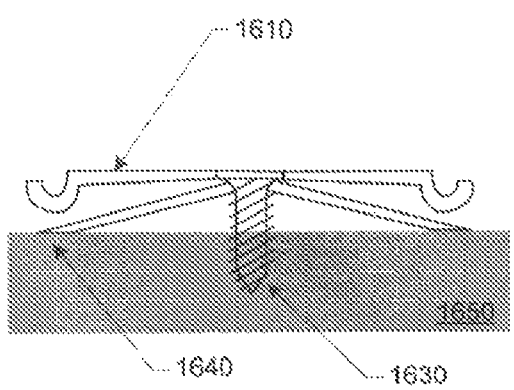
FIG. 16B depicts a cross-section of an exemplary device for attaching items to a surface, in accordance with some embodiments of the present invention.

FIGS. 16A and 16B illustrate the use of a fastener such as a screw or nail to attach the device 1610 to a surface. Device 161 may comprise a hole or aperture 1620 through which a nail or screw 1630 may be inserted. In accordance with some embodiments, hole or aperture 1620 may not be present, and a user may use a nail or screw to penetrate through the surface of device 161. FIG. 16B illustrates a cross section of device 1600 installed. Screw 1630 extends through the device 1610 and is attached to surface 1650. Note that in this illustrated embodiment, an item is retained between a pressure component and a second element 1640. Again, any of the embodiments discussed herein may utilize this methodology or may pinch an item between a pressure element and a surface.

Figure 17A:
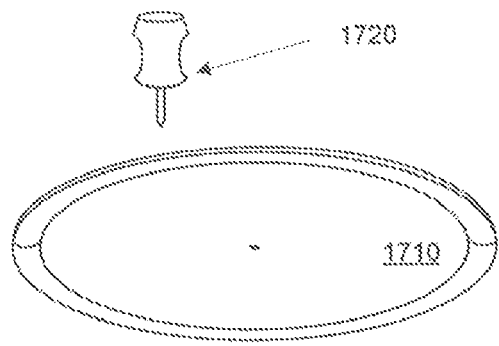
FIGS. 17A and 17B depict a cross-section of an exemplary device for attaching items to a surface, in accordance with some embodiments of the present invention.
Figure 17B:
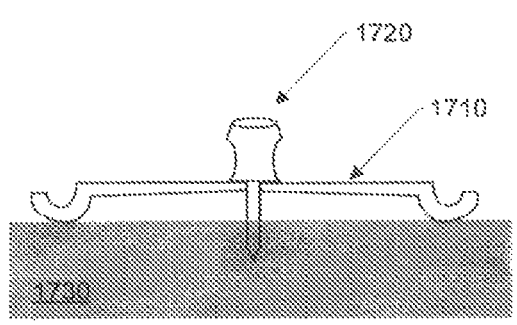

FIG. 17 illustrates an exemplary cross-section of a device 1700 in accordance with some embodiments of the present invention that utilizes a pushpin 1720 as an attachment device. Pushpin 1720 may be inserted through a hole or aperture in the device 1710 (or may penetrate the device 1710 to make its own hole or aperture) and may extend therethrough to engage a surface 1730.

Figure 18A:
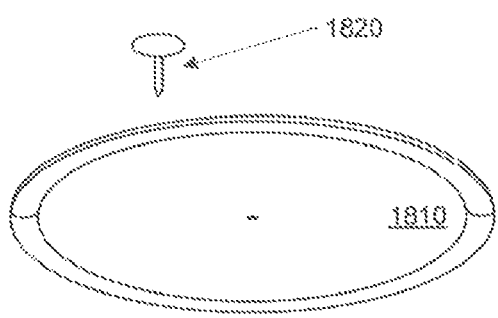
FIGS. 18A and 18B depict a cross-section of an exemplary device for attaching items to a surface, in accordance with some embodiments of the present invention.
Figure 18B:
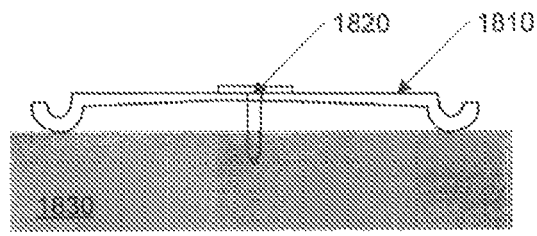

FIG. 18 illustrates an exemplary cross-section of a device 1800 in accordance with some embodiments of the present invention that utilizes a tack 1820 as an attachment device.

Tack 1820 may be inserted through a hole or aperture in the device 1810 (or may penetrate the device 1810 to make its own hole or aperture) and may extend therethrough to engage a surface 1830.

Figure 19A:
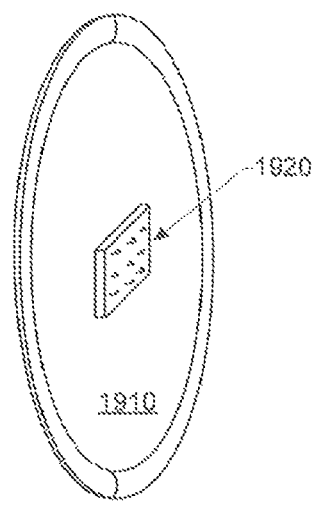
FIGS. 19A and 19B illustrate an exemplary device for attaching items to a surface, in accordance with some embodiments of the present invention.
Figure 19B:
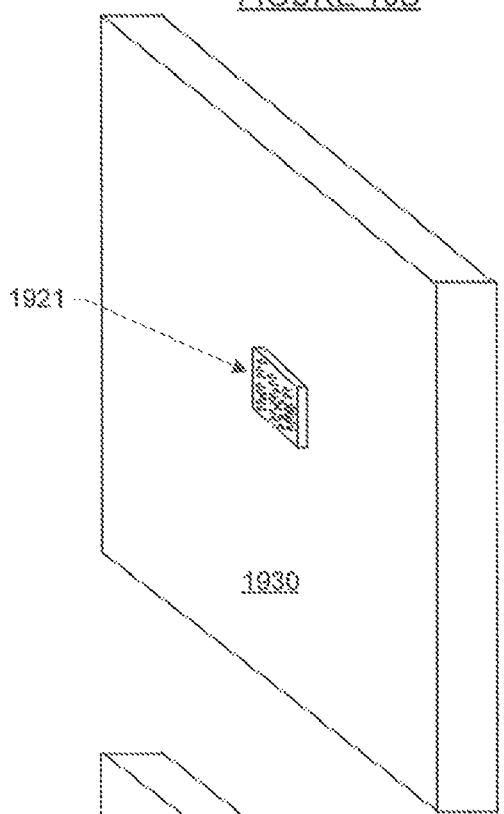

It is also contemplated that a device may be attached to a surface by interacting with the surface itself, or with additional items or components attached to surface. For example, and with reference to FIG. 19, a device 1910 may be attached to a surface 1930 through the use of hook-and-loop devices. One portion (for example, the hooks) 1920 may be attached (for example, through the use of an adhesive) to a device 1910, while the other portion (for example, the loops) 1921 may be attached (for example, through the use of an adhesive) to a surface 1930.

Figures 20A, 20B:
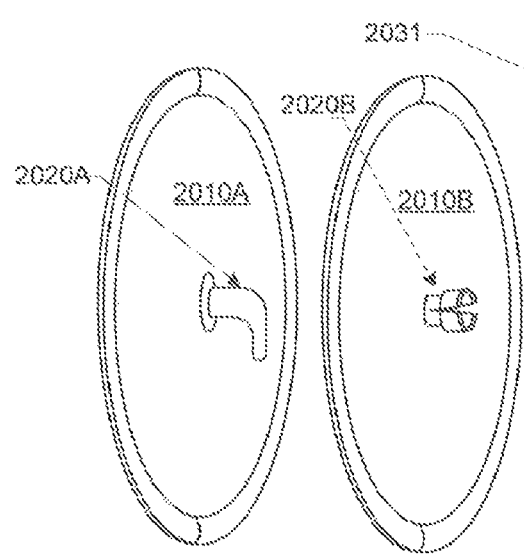
FIGS. 20A-20C illustrate an exemplary device for attaching items to a surface, in accordance with some embodiments of the present invention.
Figure 20C:
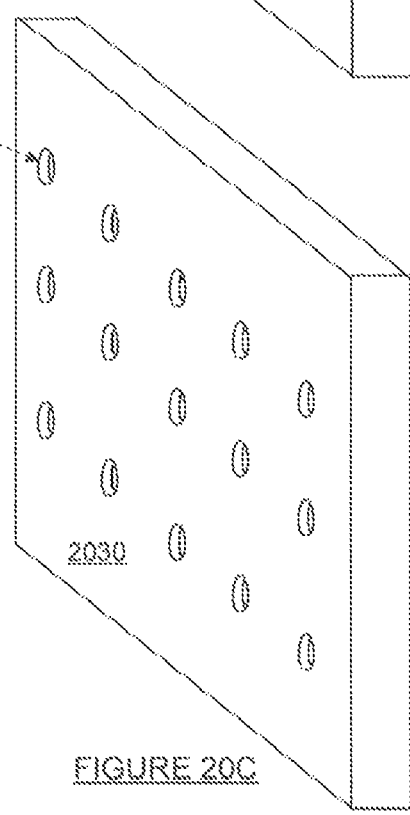

FIG. 20 illustrates attachment of a device 2010 in accordance with some embodiments of the present invention to a peg board 2030, or other surface with a hole or aperture therein. Device 2010 may comprise one or more hooks 2020 that may be inserted into one or more holes or apertures 2031 in peg board 2030.

Figure 21:
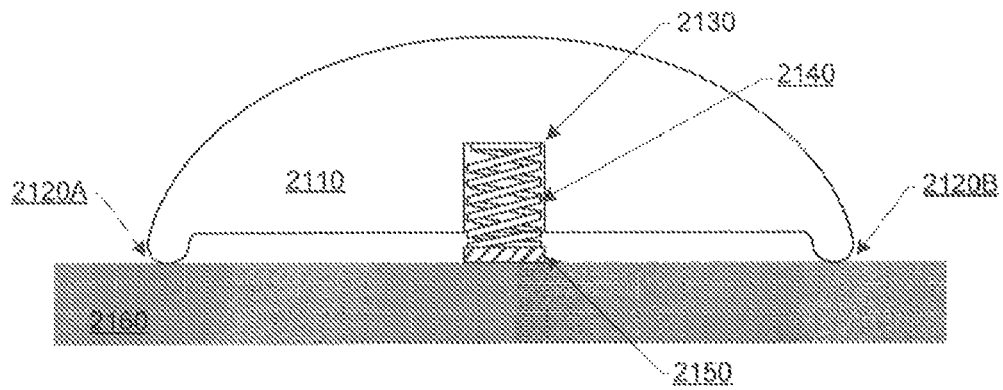
FIG. 21 depicts a cross-section of an exemplary device for attaching items to a surface, in accordance with some embodiments of the present invention.

With reference to FIG. 21, an alternative manner of introducing a force between a pressure component and a surface (or additional element) will now be discussed. Device 2110 may be held tight against a surface 2160 through the use of a tension device 2140, such as a spring. Alternative to a spring may be an elastic, bungee, or any other material with elastic properties. Device 2110 may comprise one or more portions 2120A, 2120B for contacting surface 2160, between which an item may be retained. Tension device 2140 may be connected to both device 2110 and surface 2160. Connection to the device 2110 may be through any means, including positioning tension device 2140 in an aperture 2130 formed in the device 2110. Tension device 2110 may also be attached to surface 2160 through adhesive 2150 or other mechanical connection.

Figure 22A:
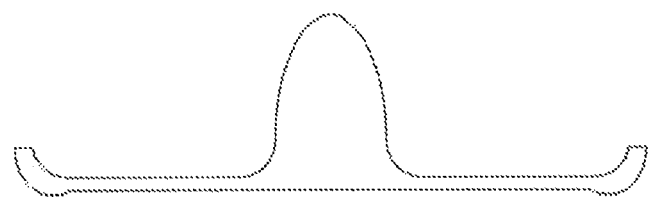
FIG. 22A-22C illustrate side views of various exemplary devices for attaching items to a surface, in accordance with some embodiments of the present invention.
Figure 22B:
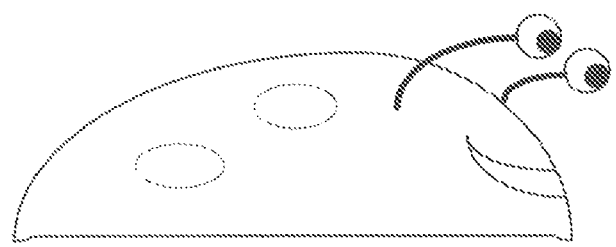
Figure 22C:
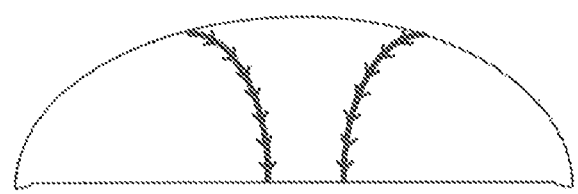

Note that unlike some attachment mechanisms known in the art (such as tape, adhesives, etc.), devices in accordance with some embodiments of the present invention may present or provide three-dimensional aspects that may be used to create aesthetically pleasing sculptures or reliefs. For example, FIG. 22A illustrates a device 2200A in the shape of a sombrero. FIG. 22B illustrates a device 2200B in the shape of a bug, while FIG. 22C illustrates a device 2200C in the shape of half of a baseball.

Note that when the device in accordance with some embodiments of the present invention uses an additional element to pinch and hold items, there is no requirement of proximity to the surface upon which the device is mounted. Accordingly, there are numerous options of multiple item holding in a three-dimensional arrangement.

Figure 23:
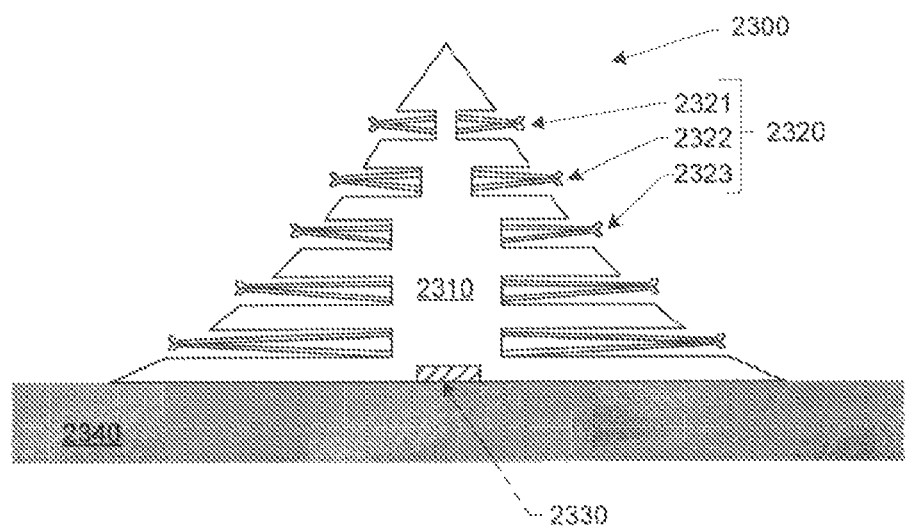
FIG. 23 illustrates a cross-section of an exemplary device for attaching items to a surface, in accordance with some embodiments of the present invention.

For example, and with reference to FIG. 23, a device 2310 may comprise one or more portions for holding an item 2320, mounted to a surface 2340 via an attachment device 2330. The one or more portions for holding an item 2320 may comprise portions 2321, 2322, 2323, which in turn may comprise—as discussed above—one or more pressure components and additional elements, configured to pinch and hold an item.

Figure 24A:
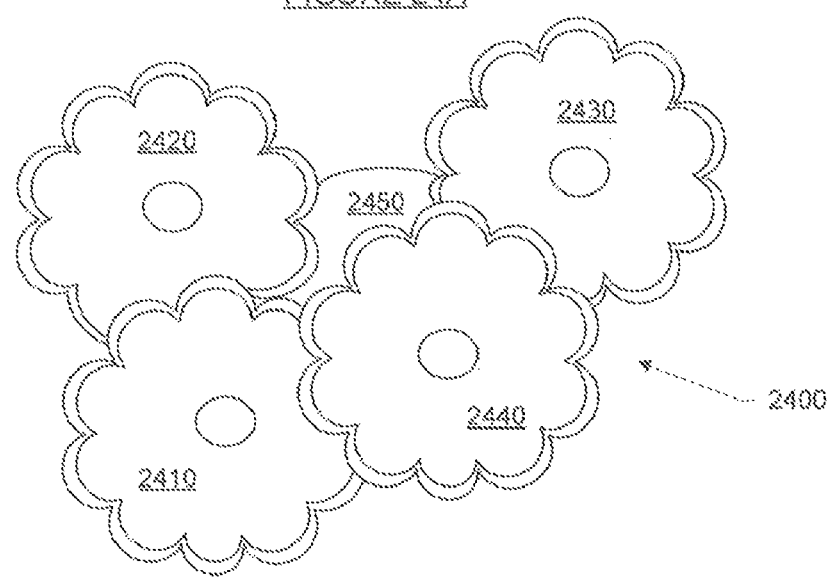
FIG. 24A illustrates a top view of an exemplary device for attaching items to a surface, in accordance with some embodiments of the present invention.
Figure 24B:
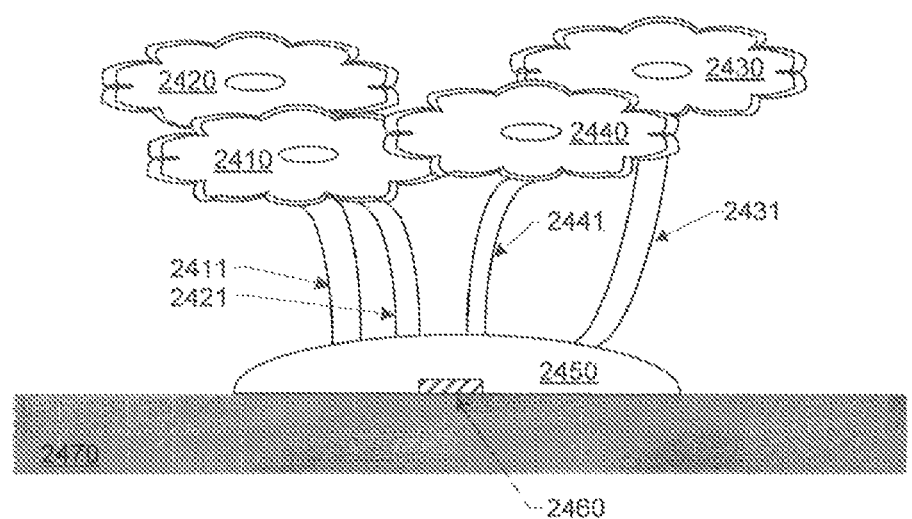
FIG. 24B illustrates a side view of an exemplary device for attaching items to a surface, in accordance with some embodiments of the present invention.

With reference to FIG. 24A and FIG. 24B, a device 2400 may be of more aesthetically pleasing configuration. For example, device 2400 may comprise one or more flowers 2410, 2420, 2430, 2440, which may be attached to a base 2450 via stems 2411, 2421, 2431, 2441. Base 2450 may be attached to a surface 2470 via an attachment device, as described in various embodiments above.

One or more of the flowers 2410, 2420, 2430, 2440 may comprise attachment devices along the perimeter of the flower, in the stems, or in any other area or portion of the device. In this manner, items may be held in various orientations, rather than only being held substantially coplanar with the surface. Note that the embodiment of flowers is exemplary only, and it is fully considered by the present invention that various shapes, sizes, configurations, sculptures, etc. may be employed.

Figure 25:
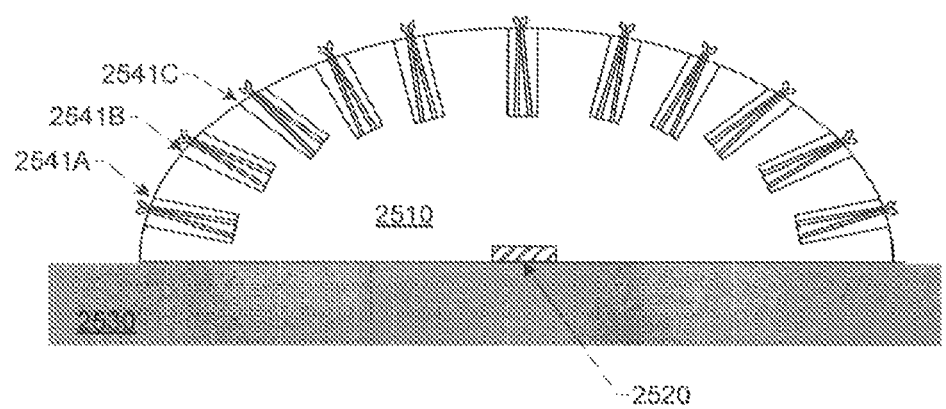
FIG. 25 illustrates a side view of an exemplary device for attaching items to a surface, in accordance with some embodiments of the present invention.

With reference to FIG. 25, a device 2510 in accordance with some embodiments of the present invention will now be discussed. Device 2510 may be attached via attachment device 2520 to a surface 2530. Device 2510 may comprise a plurality of openings 2541A, 2541B, 2541C, etc. within which one or more pressure components may be utilized to pinch and/or otherwise hold an item. In this manner, a single device may hold numerous items in various arrangements and positions. Again, note that items need not be held in a manner substantially coplanar with the surface 2530.

Figure 26:
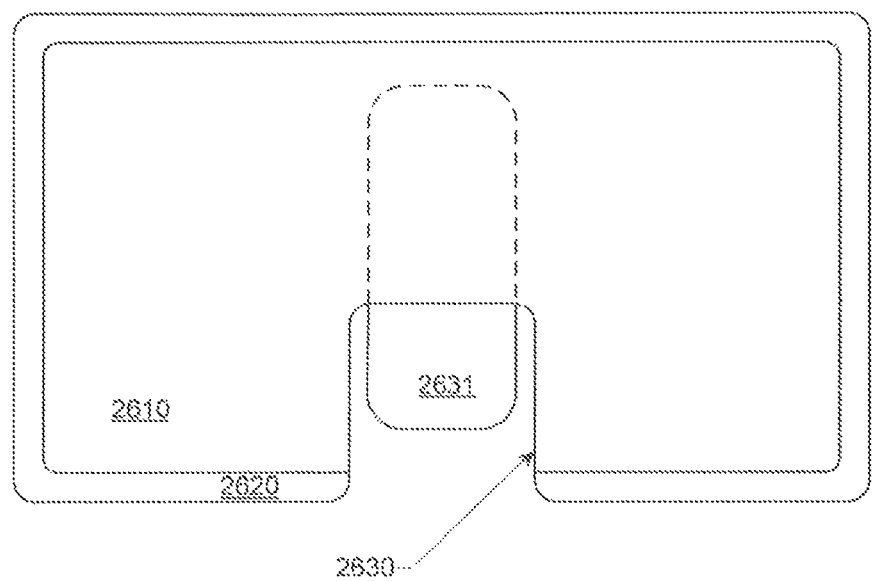
FIG. 26 illustrates a top view of an exemplary device for attaching items to a surface, in accordance with some embodiments of the present invention.

The overall configuration of the devices may also be contoured in a manner complementary to an attachment device used. For example, when a tack or pushpin is used (as discussed above), the device may be produced with a hole or aperture configured to receive the spike of such tack or pushpin. Similarly, if a removable adhesive device is used—such as but not limited to hanging strips such as those marketed under the COMMAND brand hanging strips by 3M—the device may be configured to provide a user with access to the hanging strip for ease of removal. With reference to FIG. 26 this can be seen in device 2600 which may comprise a surface 2610 with a pressure component 2620 that may be present along the perimeter of the surface 2610, or only a portion of the perimeter. The surface 2610 may be configured with a profile including a cut-out 2630 such that a user can easily access attachment device 2631 for attachment or removal.

Figure 27A:
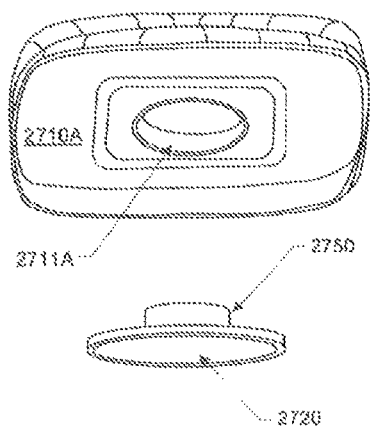
FIG. 27A-27C illustrate various configurations of an exemplary device for attaching items to a surface, in accordance with some embodiments of the present invention.
Figure 27B:
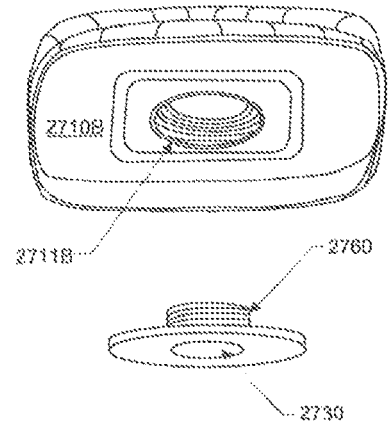
Figure 27C:
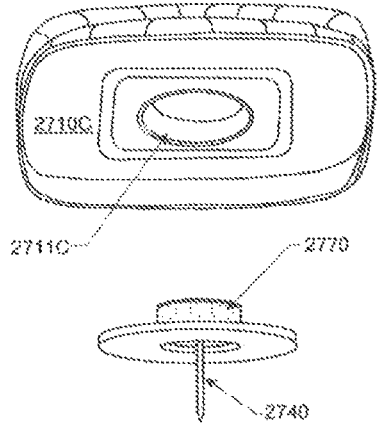

As noted above, it is anticipated that different users may prefer different attachment devices and methods, depending on the type of surface to which the device is to be attached. Accordingly, it may be desirable to configure a device to connect to different types of attachment devices. For example, as shown in FIGS. 27A-27C, a device 2710A, 2710B, 2710C may be configured with an opening or indent 2711A, 2711B, 2711C to receive a portion 2720, 2730, 2740 (respectively) onto which the attachment device may be connected. With reference to FIG. 27A, adhesive putty may be used in in portion 2720. Portion 2720 may be attached to the device 2710A through any means, though it is shown that an interference fit may be utilized by pressing a flange 2750 of portion 2720 into device 2710A.

Similarly, device 2710B may attach to a portion 2730 through a threaded connection, and portion 2730 may be configured to receive a magnet—attached either through adhesive or an interference fit. Device 2710C may attach to portion 2740 with an interference fit, assisted with ridges and or teeth on the portion 2740 that may cause a tight fit in device 2710.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A device for attaching items to a surface, the device comprising:
   one or more attachment devices for attaching the device to the surface;
   one or more pressure components connected to the attachment device, the one or more pressure components disposed in a plane substantially parallel to the surface, a lip portion of the pressure component curving first from the one or more pressure component towards the surface and then away from the surface and the pressure component, causing at least one upturned lip wherein a bottom surface of the upturned lip is biased toward and in contact with the surface;
   the one or more pressure components configured to receive an item between the upturned lip and the surface, the pressure of the biased lip portion sufficient to hold the item.

2. The device of claim 1, wherein the one or more attachment devices comprises adhesive, an adhesive tape, or adhesive putty.

3. The device of claim 2, further comprising a rib on a bottom surface of the device, the rib configured to receive an adhesive or adhesive putty.

4. The device of claim 3, wherein an area within the one or more attachment devices comprises ribs or texture configured to provide increased surface area for the adhesive or adhesive putty.

5. The device of claim 1, wherein the one or more attachment devices comprises a magnetic device.

6. The device of claim 5, further comprising a rib on a bottom surface of the device, the rib configured to receive the magnetic device.

7. The device of claim 1, wherein the one or more attachment devices comprises a fastener selected from the group consisting of a tack, thumbtack, pushpin, nail, screw, bolt, and rivet.

8. The device of claim 7, further comprising one or more holes or apertures configured to receive the one or more fasteners.

9. The device of claim 1, wherein the one or more attachment devices comprises one or more suction cups.

10. The device of claim 9, further comprising one or more holes or apertures configured to receive the one or more suction cups.

11. The device of claim 1, wherein the one or more pressure components are held a first distance away from the surface and the upturned lip has a depth greater than the first distance, thereby resulting in pressure being exerted by the bottom surface of the lip on the surface.

12. A device for attaching items to a surface, the device comprising:
   one or more attachment devices for attaching the device to the surface;
   one or more pressure components connected to the attachment device, the one or more pressure components disposed in a plane substantially parallel to the surface, the pressure component comprising a lip portion, curving first from the one or more pressure component towards the surface and then away from the surface, causing at least one upturned lip;
   a bottom plate, positioned proximate to the one or more pressure components such that a bottom surface of the upturned lip is in contact with the bottom plate;
   the one or more pressure components configured to receive an item between the upturned lip and the bottom plate, the pressure of the biased lip portion is sufficient to hold the item; and
   one or more attachment cores configured to receive the device and attach or fasten the device to the surface.

13. The device of claim 12, wherein the one or more pressure components are biased toward the plate.

14. The device of claim 12, wherein the one or more pressure components are held a first distance away from the plate and the upturned lip has a depth greater than the first distance, thereby resulting in pressure being exerted by the bottom surface of the lip on the plate.

15. The device of claim 13, wherein the plate is biased toward the one or more pressure components.

16. The device of claim 1, wherein the device comprises designs or markings identifying a provider of goods or services.

17. The device of claim 1, wherein the device is configured in an aesthetically pleasing manner.

18. A device for attaching items to a surface, the device comprising:
    one or more attachment devices configured for attachment to the surface;
    one or more pressure components connected to the attachment device and disposed in a plane substantially parallel to the surface, the one or more pressure components comprising a lip portion curving first from the one or more pressure component towards the surface and then away from the surface, causing at least one upturned lip wherein a bottom surface of the upturned lip is biased toward and in contact with the surface;
    one or more attachment cores configured to receive the attachment device and attach or fasten to the one or more pressure components.

19. The device of claim 18, wherein the attachment device is selected from the group consisting of an adhesive, adhesive tape, foam adhesive tape, putty, adhesive putty, screws, nails, tacks, thumbtacks, pushpins, bolts, rivets, magnets, hooks, hook-and-loop devices, and suction cups.

20. The device of claim 18, further comprising one or more plates wherein the one or more pressure components are biased towards the plates.

21. The device of claim 20, wherein the device is configured to hold items in a substantially non-coplanar arrangement with the surface.

* * * * *